United States Patent
Soltis, Jr. et al.

(10) Patent No.: US 7,028,196 B2
(45) Date of Patent: Apr. 11, 2006

(54) SYSTEM, METHOD AND APPARATUS FOR CONSERVING POWER CONSUMED BY A SYSTEM HAVING A PROCESSOR INTEGRATED CIRCUIT

(75) Inventors: Donald C. Soltis, Jr., Fort Collins, CO (US); Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 503 days.

(21) Appl. No.: 10/319,667

(22) Filed: Dec. 13, 2002

(65) Prior Publication Data

US 2004/0117678 A1 Jun. 17, 2004

(51) Int. Cl.
*G06F 1/26* (2006.01)
*G06F 12/00* (2006.01)

(52) U.S. Cl. .................. 713/300; 713/320; 711/169
(58) Field of Classification Search ................ 713/300, 713/320, 322, 323, 324, 330, 340; 711/122, 711/119, 169
See application file for complete search history.

(56) References Cited

U.S. PATENT DOCUMENTS

| | | | | |
|---|---|---|---|---|
| 5,515,539 A | * | 5/1996 | Ohashi et al. | 713/324 |
| 5,787,469 A | * | 7/1998 | Merrell | 711/122 |
| 6,141,762 A | * | 10/2000 | Nicol et al. | 713/300 |
| 6,385,710 B1 | * | 5/2002 | Goldman et al. | 711/169 |
| 6,792,551 B1 | * | 9/2004 | Dai | 713/320 |

OTHER PUBLICATIONS

IBM, Power Managed Second-Level Cache Control, Apr. 1, 1996, vol. 39, Issue 4, pp. 79-82.*

* cited by examiner

*Primary Examiner*—Thomas Lee
*Assistant Examiner*—Suresh K Suryawanshi

(57) ABSTRACT

A processor integrated circuit has at least one processor and two or more levels of cache memory. A first power connection provides power to the processor and lower level cache, which form a first power domain. The integrated circuit has a second power connection providing power to upper level cache of the circuit, forming a second power domain. There may be additional power connections to the integrated circuit, forming additional power domains, such as periphery or memory-interface power.

7 Claims, 3 Drawing Sheets

SYSTEM, METHOD AND APPARATUS FOR CONSERVING POWER CONSUMED BY A SYSTEM HAVING A PROCESSOR INTEGRATED CIRCUIT

FIELD OF THE INVENTION

The invention relates to the field of power management in computer systems of the type having at least one processor and cache memory.

BACKGROUND OF THE INVENTION

Integrated circuits combining at least one high performance processor with on-chip cache memory have become common in the art. Integrated circuits combining more than one high performance processor with on-chip cache memory are also available.

Memory references from a processor that are found in a cache are known as cache "hits". Memory references that do not "hit" in cache are cache "misses". Memory read references that "hit" in cache return instructions or data to the processor in less time than is required to fetch instructions or data from higher levels of memory.

Many high performance processor integrated circuits have two power domains, a first power domain operating at a relatively low, core, voltage; and a second power domain operating at a higher, I/O (Input/Output) voltage. This typically permits design of processor and cache circuitry with transistors of smaller dimensions, including oxide thickness, than those used in the I/O pad ring. Typical processors, including the Pentium-3 (trademark of Intel Corporation) processors, require that both the core and I/O power domains receive power for correct operation.

Standard real time clock circuits also typically have two power domains. A first power domain operates the I/O pad ring and most other logic of the circuit. A second power domain provides power to the clock circuitry, and often to memory circuitry, on the same integrated circuit. These circuits are typically powered on both I/O and clock power domains during normal operation of a system, and powered by a battery on the clock power domain when the system is in a low-power state. It has been found that interface logic between the power domains must be carefully designed to prevent excessive load on the attached battery, and to prevent corruption of clock domain memory and logic during power transitions of the I/O power domain.

It is well known in the art of CMOS integrated circuits that circuit speed is a function of power supply voltage. It is also known that circuit speed is also a function of temperature.

High performance processor integrated circuits are known to consume copious amounts of power; power requirements may exceed one hundred twenty-five watts. Multiple processor integrated circuits can have even higher power requirements, potentially as much as one hundred and fifty watts.

High power consumption can result in undesirably short battery life in portable systems. High power consumption is environmentally undesirable, requires that cooling apparatus be provided, and can result in critical circuitry overheating. In addition, high power processors require a large and expensive infrastructure in terms of power delivery and heat removal. This infrastructure decreases the density of processors that can be attained within a given volume. This density of computation is an increasingly important metric.

High power consumption can also elevate temperatures of integrated circuits, including processor integrated circuits, enough that circuit speed slows to the point that processor errors occur. These errors are undesirable. Further elevation of processor temperatures can cause permanent damage to the circuits.

It is known that load requirements on computer systems vary with time. Computer system performance can be degraded to conserve power during times of low load, and returned to full performance during times of high load. It is also known that cache usage, including hit rate, can vary with time.

Processor power for each power domain typically has two components, static power that is constant with operating frequency, and dynamic power that is a function of operating frequency. Many notebook computers are equipped with adjustable clock circuits whereby processor operating frequency may be reduced, thereby reducing power consumption, during times of low load.

It is desirable to have additional ways of adjusting power consumption and performance to system load. It is also desirable to monitor processor temperature and to adjust power consumption and performance to avoid processor errors and to prevent permanent damage to the integrated circuits.

SUMMARY OF THE INVENTION

A processor integrated circuit has at least one processor and two or more levels of cache memory. A first power connection provides power to the processor and lower level cache, which form a first power domain. The integrated circuit has a second power connection providing power to upper level cache of the circuit, forming a second power domain. There may be additional power connections to the integrated circuit, forming additional power domains, such as periphery or memory-interface power.

In particular embodiments, the integrated circuit has interface circuitry between the power domains. This interface circuitry buffers and controls signals crossing domain boundaries to prevent improper operation of the circuit as voltage differences arise.

A system embodying the processor integrated circuit has at least two independent power supply subsystems, each connected to one of the power connections of the processor integrated circuit. Each power supply subsystem is independently controllable by I/O circuitry of the system; the I/O circuitry may incorporate a system management processor. The system is capable of adjusting system power consumption and performance to system load by independently controlling the power supply subsystems and altering performance of the processor and cache.

A particular embodiment adjusts upper level cache performance by adjusting cache latency relative to processor cycles. The upper level cache of this embodiment is adjustable to latency of between two and five cycles. The power supply subsystem coupled to provide power to the upper level cache of this embodiment is capable of adjustment to a first, lower, operating voltage when latency is set to a high number of cycles or clock frequency is low, and to a second, higher, operating voltage when latency is set to a low number of cycles and clock frequency is high.

DETAILED DESCRIPTION OF THE EMBODIMENTS

Figure 1:
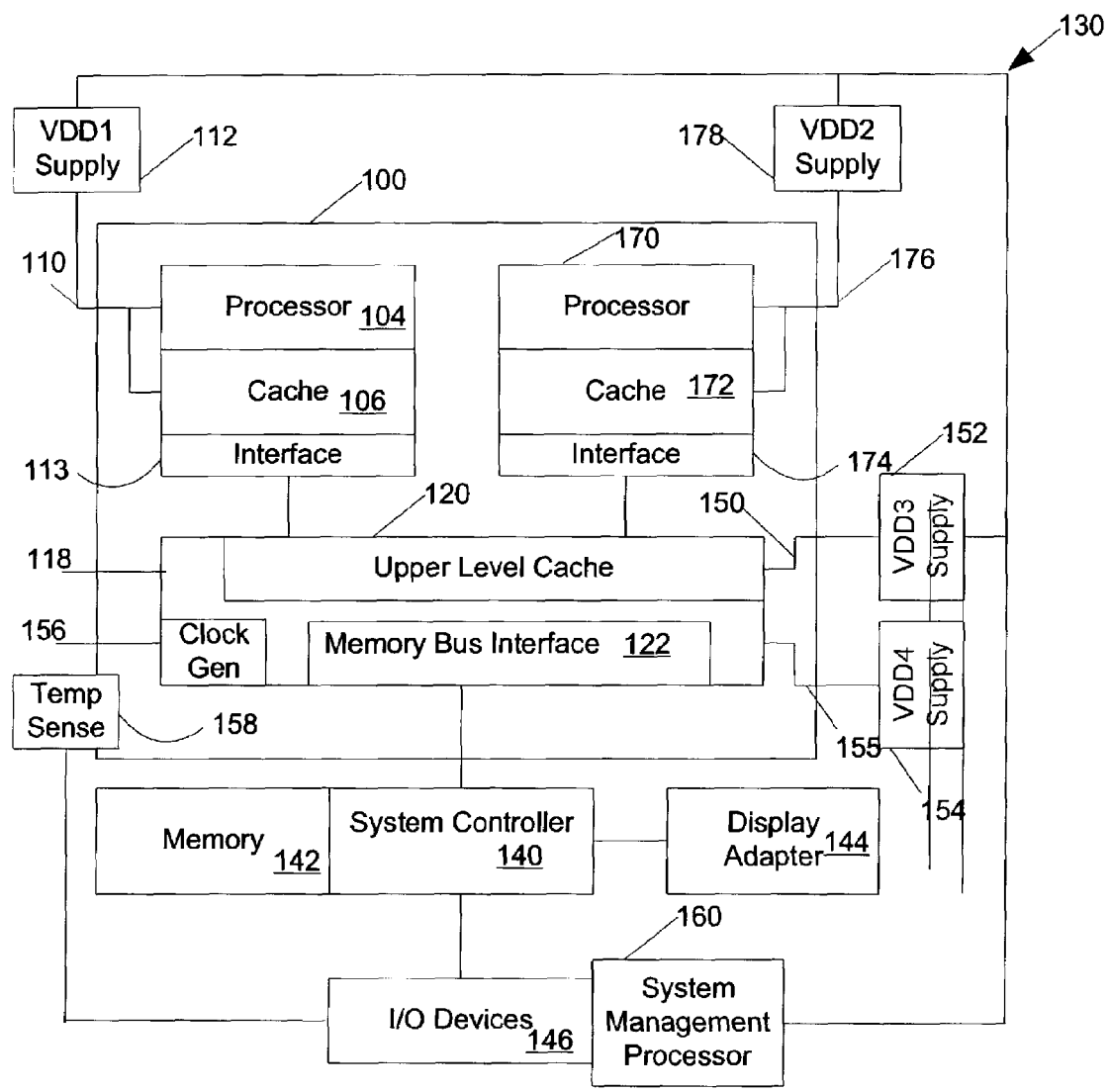
FIG. 1 is a block diagram of a system embodying a processor integrated circuit.

A processor integrated circuit 100 (FIG. 1) has a first processor 104 with cache 106. Processor 104 has a power connection 110 driven in a system 130 by an off-chip, controllable, power supply 112. Cache misses from cache 106 and I/O references from first processor 104 are passed through an interface 113 to common circuit elements 118, which includes a upper-level cache memory 120. In a computer system 130 using the processor chip 100, misses from upper-level cache 120 are passed through a memory bus interface 122 to off-chip system controller 140, where they are decoded and passed to main memory 142, display adapter 144, and I/O devices 146.

Upper level cache memory 120 has a power connection 150 driven by a controllable power supply 152 of system 130, and memory bus interface 122 by a power supply 154 of system 130 set to a voltage required for good memory-interface bus performance.

The common circuit elements 118 include clock circuits 156. A temperature sensor 158 is provided for monitoring a temperature of processor integrated circuit 100.

In a particular embodiment, I/O devices 146 include a system management processor 160 coupled to read temperature from temperature sensor 158 and to control controllable power supplies 112 and 152 and communicate with the processor chip 100.

In a particular embodiment, processor chip 100 also has a second processor 170, lower-level cache 172, and interface 174 to the upper level cache. Second processor 170 has a power supply connection 176 driven by an additional controllable power supply 178.

First processor 104 and cache 106 of the circuit, together form a first CPU power domain. Upper level cache 120 forms a second power domain. The memory bus interface 122 forms a third power domain. In embodiments having second processor 170, second processor 170 and cache 172 form a second CPU, or fourth chip, power domain. Each cache 106 and 172 may be a single level cache, or in a particular embodiment, each cache 106 and 172 is a multi-level cache system of two or more levels.

In an alternative embodiment, (not shown) there are four processors, each having its own first level cache, each having independent power connections forming four CPU power domains. It is anticipated that other embodiments may have additional power connections to the integrated circuit, forming additional power domains.

In particular embodiments, the integrated circuit has interface circuitry between each pair of communicating power domains. This interface circuitry controls signals crossing domain boundaries to prevent improper operation, or destruction, of the circuit as power supplies change voltage. In a particular embodiment of a multiple processor integrated circuits fabricated in P-well or twin-well CMOS processes, this interface circuitry may be designed according to the following rules:

1. To prevent forward-biasing of junctions, signals driven by gates powered by the any power domain are never connected to any P-diffusion located in a well that is electrically connected to any power supply of any other power domain;
2. To prevent corrupt operation, circuitry in the third power domain is designed to ignore all transitions in the first power domain when power provided to the first power domain is less than that required for normal operation;
3. To prevent corrupt operation, circuitry in each power domain is designed to ignore all signal transitions originating in other power domains when voltage provided to the other power domains is less than that required for correct operation;
4. To allow for voltage differences between domains, gate thresholds of the interface circuitry are designed to have broader signal margins than required for most circuitry of the chip.

A system 130 embodying the multiple processor integrated circuit 100 has multiple independently-controllable power supply subsystems 112, 152, 154, and 178, each connected to a power connection 110, 150, 155, 176, of the multiple processor integrated circuit 100.

In a particular embodiment, system controller 140, memory 142, display adapter 144, and I/O devices 146, are provided with power from a source separate from the controllable cache and processor core power supplies 112, 152 and 178.

Processor power supply subsystems 112 and 178 are independently controllable by I/O devices 146 of the system. The system 130 is capable of adjusting system power consumption and performance to system load by independently controlling power supply subsystems 112, 178 and 152 in conjunction with adjustments made to clock rates at the clock generator 156 and cache memory 120 latency. In a particular embodiment, the system is capable of shutting off power to the second or other processors 170, by turning off their power supply 178, while providing power to, and operating, the first processor 104 through power supply 112.

It is known that processor integrated circuits have maximum frequencies of operation that vary with power supply voltage. A plot of operating frequency versus voltage is known as a "schmoo plot". In particular, it is known that maximum operating frequency of a processor typically increases as processor voltage is increased. It is also known that power consumption of a cache memory typically increases proportional to the square of the processor voltage.

It is therefore possible to choose a first, high performance, operating point of voltage and access time for a cache, such as upper level cache memory 120. The high performance operating point is capable of higher frequency operation, but requires higher operating voltage and typically results in considerably higher power consumption than at a low performance operating point.

The low performance operating point of voltage and access time is a combination of lower operating voltage and longer access time than the high performance operating point.

Since the low performance operating point has longer access time than the high performance operating point, this operating point requires additional latency delay clock cycles if it is to be used with a high performance operating point of the processor. In a particular embodiment, the higher-level cache memory 120 is therefore designed with a programmable latency. In a particular embodiment the latency allocable to cache memory access is programmable to a number of clock cycles between two and six.

Figure 2:
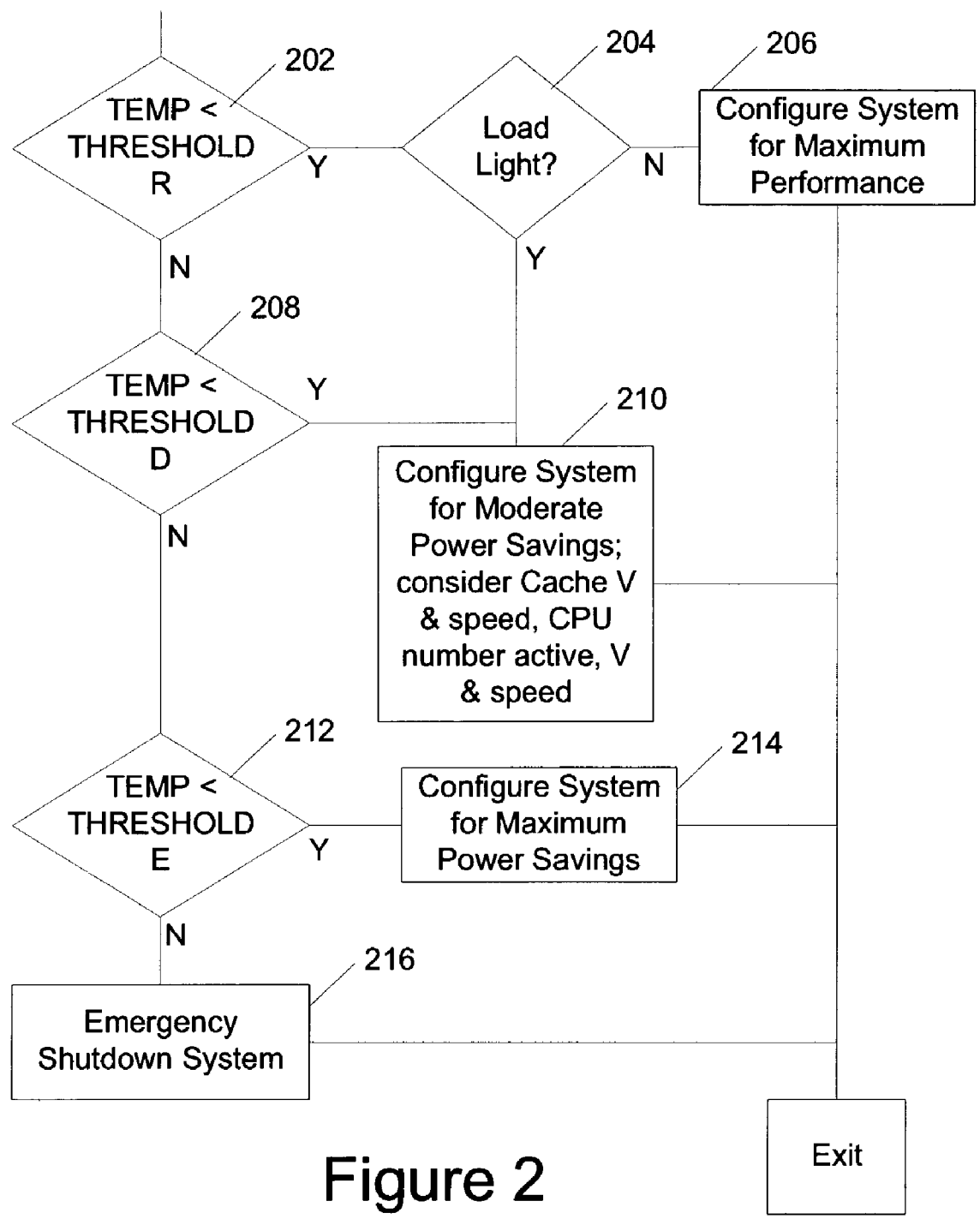
FIG. 2, a flowchart of portions of a periodically invoked process for adjusting and controlling power consumption in a computer system.

In a system 130 embodying the processor circuit 100, a system power-control task (FIG. 2) is invoked periodically. This task has portions that execute on both a processor of the circuit 100, and portions that execute on the system management processor 160. The power-control task begins by reading a processor-circuit 100 temperature from the temperature sensor 158. This temperature is compared 202 with a first, power reduction, threshold. If the temperature is below the reduction threshold, system load is checked 204. If system load is high, the system is configured 206 for maximum performance by setting cache 120 operating voltage high, processor 104 operating voltage high, and clock rate high.

If system load is low, or if the temperature was above the reduction threshold but below a drastic conservation threshold, the system is intelligently configured 210 for moderate power conservation.

If system temperature exceeds the drastic conservation threshold, but is lower than an emergency shutdown threshold 212, the system is configured for minimum power dissipation and maximum power conservation 214. This is done by setting the upper-level cache 120 latency to a high value, reducing cache power 152 to the low operating point, setting the clock rate to processor 104 and lower level cache 106 to a low value, and reducing processor power 112 to a low value. In an embodiment having multiple processors on the circuit 100, the additional processors 170 are turned off. While system performance in this maximum conservation mode is low, it is capable of conducting an orderly shutdown of the operating system to prevent data corruption.

Should the temperature exceed 212 the emergency shutdown threshold, an emergency shutdown 216 is performed where system operation is stopped with all, or most, power removed from the circuit 100.

Figure 3:
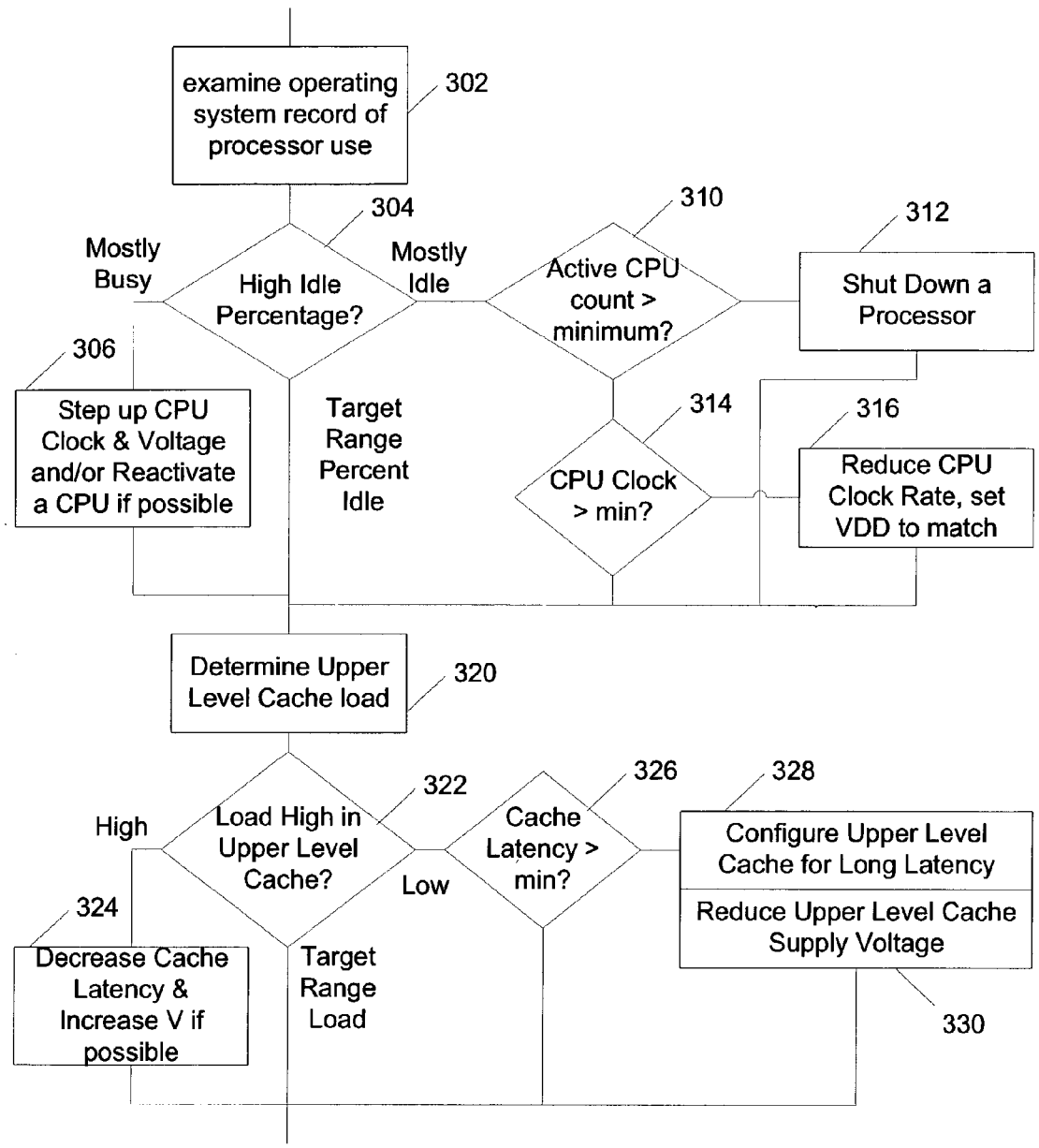
FIG. 3, a flowchart of a task for configuring a processor circuit to tradeoff performance for power consumption.

Intelligent configuration 210 of the system 130 for moderate power conservation is done (FIG. 3) by examining recent operating system records of processor utilization 302.

If 304 the processor utilization shows that processors of the system are mostly busy, CPU clock rates are stepped up and CPU power supply voltages increased 306 if they are not already at their maximum. If CPU clock is already at a maximum, idle processors are reactivated 306 as needed.

If 304 the processor utilization shows that processors of the system are mostly idle, the number of active processors of the system are compared 310 to a minimum number of processors allowed in the system. If the number of active processors exceeds the minimum, a processor 170 is shut down 312. Shutting down a processor 170 includes turning off clock to that processor and may include turning off its associated power supply 178, with result that power consumption by that processor 170 is greatly reduced or eliminated. If the number of processors was not greater than the minimum, the current CPU clock setting is checked 314 to determine if it is greater than a minimum, if so the clock rate is reduced 316.

Once the active processor number and clock rate has been adjusted as necessary, load on the upper level cache 120 is determined 320.

If 322 load is high in upper level cache 120, the upper level cache latency is decreased, and its power supply 152 voltage increased, such that the latency and voltage are in regions where the cache will operate, if the second level cache power supply voltage is not already at its maximum. If 322 upper level cache 120 load is low, and cache latency is greater than a minimum 326, then the upper level cache is configured for long latency 328 and its power supply 152 voltage is decreased 330.

In this way, upper level cache latency and operating voltage is tuned to optimize power consumption of the integrated circuit.

While the forgoing has been particularly shown and described with reference to particular embodiments thereof, it will be understood by those skilled in the art that various other changes in the form and details may be made without departing from the spirit and scope hereof. It is to be understood that various changes may be made in adapting to different embodiments without departing from the broader concepts disclosed herein and comprehended by the claims that follow.

What is claimed is:

1. A processor integrated circuit comprising:
   at least one processor having at least one power connection;
   a lower level of cache memory coupled to provide instructions to the at least one processor;
   an upper level of cache memory coupled to provide instructions to the lower level of cache memory upon a miss in the lower level of cache memory, the upper level of cache memory having at least one power connection separate from the at least one power connection of the at least one processor; and
   a clock generator circuit for providing a clock signal having a clock rate to the processor integrated circuit, wherein the upper level of cache memory is adaptable to at least a first and a second level of latency;
   wherein the integrated circuit is capable of switching between a first mode wherein the cache memory operates at the first level of latency at a first cache power connection voltage and a second mode wherein the upper level of cache memory operates at the second level of latency at a second cache power connection voltage.

2. The processor integrated circuit of claim 1, wherein the first level of latency of the second level of cache memory is operable with a first voltage applied to the at least one power supply connection of the second level of cache memory, the second level of latency of the second level of cache memory is operable with a second voltage applied to the at least one power supply connection of the second level of cache memory, and wherein the first level of latency of the cache memory is not operable with the second voltage applied to the at least one power supply.

3. The processor integrated circuit of claim 2, wherein the at least one processor comprises a plurality of processors.

4. A method of optimizing power consumption in a processor integrated circuit, the processor integrated circuit comprising:
   at least one processor, the at least one processor having at least one power connection;
   a lower level of cache memory coupled to provide instructions to the at least one processor;
   an upper level of cache memory coupled to provide instructions to the lower level of cache memory upon a miss in the lower level of cache memory, the upper level of cache memory having at least one power connection separate from the at least one power connection of the at least one processor;
   the method comprising:
   when upper level cache load is low:
   configuring the upper level of cache for a high latency, and
   reducing a voltage applied to the at least one power connection of the upper level of cache memory; and when upper level cache load is high:
    increasing a voltage applied to the at least one power connection of the upper level of cache memory, and
    decreasing the latency of the upper level of cache.

5. The method of claim 4 further comprising:
when a power reduction temperature threshold is exceeded,
configuring the upper level of cache for a high latency, and
reducing a voltage applied to the at least one power connection of the upper level of cache memory.

6. The method of claim 5 further comprising:
when a maximum operating temperature is exceeded:
shutting down operation of the upper level of cache memory.

7. The method of claim 4 wherein configuring the upper level of cache memory for a high latency is performed by increasing a number of clock cycles allowed for accessing the cache memory.

* * * * *

UNITED STATES PATENT AND TRADEMARK OFFICE
CERTIFICATE OF CORRECTION

| | |
|---|---|
| PATENT NO. | : 7,028,196 B2 |
| APPLICATION NO. | : 10/319667 |
| DATED | : April 11, 2006 |
| INVENTOR(S) | : Donald C. Soltis, Jr. et al. |

It is certified that error appears in the above-identified patent and that said Letters Patent is hereby corrected as shown below:

In column 6, line 30, in Claim 1, after "wherein the" insert -- upper level of --.

Signed and Sealed this

Fifth Day of January, 2010

David J. Kappos
*Director of the United States Patent and Trademark Office*